United States Patent [19]

Hafner

[11] 4,081,612
[45] Mar. 28, 1978

[54] METHOD FOR BUILDING-UP OF ROUTING ADDRESSES IN A DIGITAL TELECOMMUNICATION NETWORK

[75] Inventor: Emanuel R. Hafner, Wohlen, Switzerland

[73] Assignee: Hasler AG, Bern, Switzerland

[21] Appl. No.: 705,251

[22] Filed: Jul. 14, 1976

[30] Foreign Application Priority Data

Jul. 31, 1975 Switzerland .................. 9990/75
Aug. 18, 1975 Switzerland .................. 10711/75

[51] Int. Cl.² ............... H04L 15/00; H04Q 9/00; H04Q 3/56
[52] U.S. Cl. ................ 179/15 BA; 178/2 C; 178/3; 179/18 EA; 340/147 R
[58] Field of Search ............ 178/2 R, 2 C, 3; 340/147 R, 147 T; 179/18 EA, 15 BA

[56] References Cited

U.S. PATENT DOCUMENTS

| | | | |
|---|---|---|---|
| 3,560,663 | 2/1971 | Lee et al. | 179/18 EA |
| 3,564,499 | 2/1971 | Ryan | 340/147 R |
| 3,705,523 | 12/1972 | Alouisa | 179/18 EA |
| 3,814,839 | 6/1974 | Lubarsky, Jr. et al. | 178/2 C |
| 3,814,840 | 6/1974 | Lubarsky, Jr. et al. | 178/2 C |
| 3,944,723 | 3/1976 | Fong | 178/3 |

Primary Examiner—Thomas A. Robinson
Attorney, Agent, or Firm—Brady, O'Boyle & Gates

[57] ABSTRACT

In a digital telecommunication network containing bearer channels between switching nodes, the method of building-up a routing address consisting of routing words that are associated with the switching nodes and via which the transmission of information packets is effected in accordance with the routing address contained in each packet, and for their storage in the region of a called subscriber, dispatching a build-up packet from the first calling subscriber which contains the location-independent call number of the called second subscriber, each switching node retransmitting to other switching nodes connected to it at least the first of several successively received build-up packets having the same call number and whose routing address does not exceed a specific length and adding to each build-up packet retransmitted a routing word associated with the bearer channel connected to it and forming a part of the travel path of the build-up packet, the called subscriber designated by the call number or the switching node connected directly to the called subscriber receiving at least one build-up packet intended for it and storing at least one of the routing addresses built-up by the build-up packet received.

11 Claims, 5 Drawing Figures

METHOD FOR BUILDING-UP OF ROUTING ADDRESSES IN A DIGITAL TELECOMMUNICATION NETWORK

The invention relates to a method for the building-up of a routing address, consisting of routing words, in a digital telecommunication network which contains bearer channels between switching nodes, with which routing words are associated and via which the transmission of information packets is effected in accordance with the routing address contained in each packet, and for their storage in the region of a called subscriber.

In copending U.S. Pat. Application Ser. No. 679,074, filed Apr. 21, 1976, for Message Network, a digital telecommunication network is described in which the interchange of messages is effected in the form of address-coded packets. The addresses are routing addresses. Such an address is, at least during one conversation, stored in each subscriber terminal or in its switching node and is added to each packet despatched. It indicates the path by which the packet reaches the conversation partner.

The compilation of the address offers no difficulties when the network, the designations of the bearer channels and the switching node to which the conversation partner is connected, are known. However, this is not the case when only the call number of the conversation partner, but not his location and the network, are known to the calling subscriber.

The task of the present invention is to indicate a method for the building-up of routing addresses for the last-mentioned instance. The method in accordance with the invention for this purpose consists in that the calling first subscriber despatches a build-up packet which contains the location-independent call number of the called second subscriber, in that each switching node retransmits to other switching nodes connected to it at least the first of several successively received build-up packets having the same call number, and whose routing address does not exceed a specific length, and adds, to each build-up packet retransmitted a routing word which is associated with the bearer channel connected to this switching node and forming a part of the travel path of the build-up packet, and in that the called subscriber characterized by the call number (B), or the switching node connected directly to him, receives at least one build-up packet intended for him and stores at least one of the routing addresses built up by the build-up packets received.

The arrangement in the switching nodes ca be made such that each node retransmits received build-up packets, which do not exceed a predetermined length, to all switching nodes connected to it. But the direction from which it has received the build-up packet can be respectively excluded.

Each switching node retransmits each build-up packet reaching it, so that finally each node is reached by at least one build-up packet. The total number of build-up packets multiplies in the case of this method from node to node, while the routing addresses collected-up lengthen linearly.

In a telecommunication network in which no bearer channel or switching node is disturbed or overloaded, any desired connected can be built-up using a minimum number of bearer channels, in which respect this number is practically different from connection to connection, but never exceeds a maximum value. This maximum value of routing words therefore suffices for the build-up of routing addresses from each subscriber to each other subscriber. In the disturbed or partially overloaded network the addresses can be longer. The number of routing words can, however, never exceed the number of switching nodes. The length of the routing address can therefore be limited to a maximum length.

This maximum length can be made dependent on an urgency indication in the packet, in such a way that in the overloaded network urgent packets still find a path which is barred to the less urgent packets.

Each switching node checks all the packets for their length and eradicates the packets which are too long. In this way the build-up procedure in each build-up packet is terminated as soon as the routing address has excessed a predetermined maximum length.

The subscriber station wanted or the switching node to which it is connected can pick-up the first received build-up packet provided with the calling subscriber's call number and store the routing address contained in it. Or it can undertake a selection from among the build-up packets received, for instance by selecting the shortest routing address.

The described method for building-up routing addresses is used for preparing connections between each two subscribers, the second subscriber terminal dispatching a reply packet which the first subscriber terminal receives, whereupon this first terminal stores the routing address contained in the reply packet.

This method for building-up routing addresses affords the essential advantage that the switching nodes need no store for storing connection data after retransmission of a packet and the control expenditure is minimal. During each build-up procedure the build-up packets flood the entire telecommunication network, only the packet lengths being monitored. With a suitably selecting maximum packet length, each switching node and therewith also the local subscribers thereof are reached by at least one build-up packet, irrespective of where the subscriber terminal is connected. There are no feedbacks between the individual build-up packets released by the same subscriber. The propagation procedure proceeds unaffected by the arrival of the build-up packets in the subscriber terminal called.

The invention is explained in more detail by way of example with reference to the attached drawings, in which.

Figure 1:
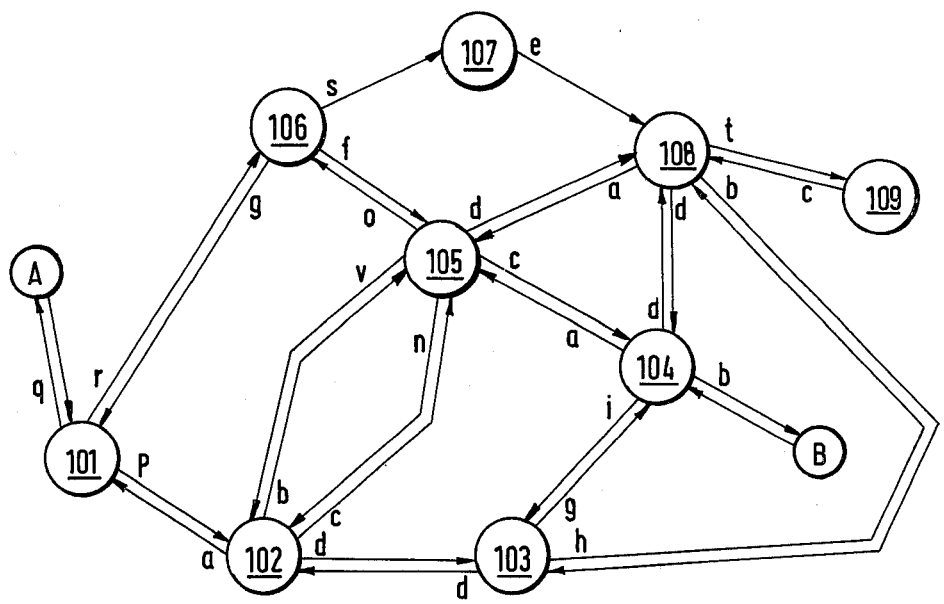
FIG. 1 shows a symbolical representation of a telecommunication network.

FIG. 1 shows a digital telecommunication network with nine switching nodes 101 to 109, between which bearer channels exist which are represented by lines. Some or even all of the switching nodes have a plurality of local subscribers, of which only the two subscribers. A and B in the case of the nodes 101 and 104 are shown.

Associated to each outgoing bearer channel leaving a node is a routing word in the form of a digital bit string which is symbolised here by the small letters *a, b, c* and so forth. Within each switching node the routing words are respectively clearly distinguishable, while within the entire network the same words can be used several times.

If messages are to be interchanged between the subscribers A and B, then both subscribers are provided each with a routing address which indicates the path on which the message packets are to run through the network from A to B and vice versa. Two possible and equivalent paths for this are:

A → 101 → 102 → 103 → 104 → B

A → 101 → 106 → 105 → 104 → B

The corresponding routing addresses are $p/d/g/b$ and $r/f/c/b$.

If the subscriber A wishes the build-up of an address and its storage at the subscriber terminal B (FIG. 1), he causes his terminal to send out a build-out pocket by lifting-off the microtelephone and dialing the call number of subscriber B. This packet contains, like any packet conveyed in the network, fields for signalling, address and information. In the signalling field it contains the identification as a build-up packet, in the information field the call number of the calling subscriber A and in the address field the call number of the called subscriber B. Moreover, it contains a field for the build-up of the routing address, which field is initially empty. The switching node 101 sends the build-up packet via its two outgoing bearer channels to the switching nodes 102 and 106. The two packets collect at this moment the routing words $p$ and $r$ in to their address fields.

The switching nodes 102 and 106 receive the packets and retransmit them via each of their outgoing bearer channels. Again the respective routing words are collected into the address field of the packets and strung to the already existing routing word. In this way there emerge build-up packets with the routing addresses $r/g$, $r/f$, $r/s$, $p/a$, $p/b$, $p/c$ and $p/d$ and the packets reach the switching nodes 101, 103, 105 and 107.

If the sending back of packets via the same bearer channel and the transmission of two packets via parallel bearer channels is prevented, then only the packets with the routing addresses $r/f$, $r/s$, $p/b$, $p/d$ are retransmitted.

The build-up procedure continues in a corresponding manner until all of the build-up packets are eradicated on account of having too great a length.

Subscriber terminal B receives at least one build-up packet and stores initially the address built up in it.

Figure 2:
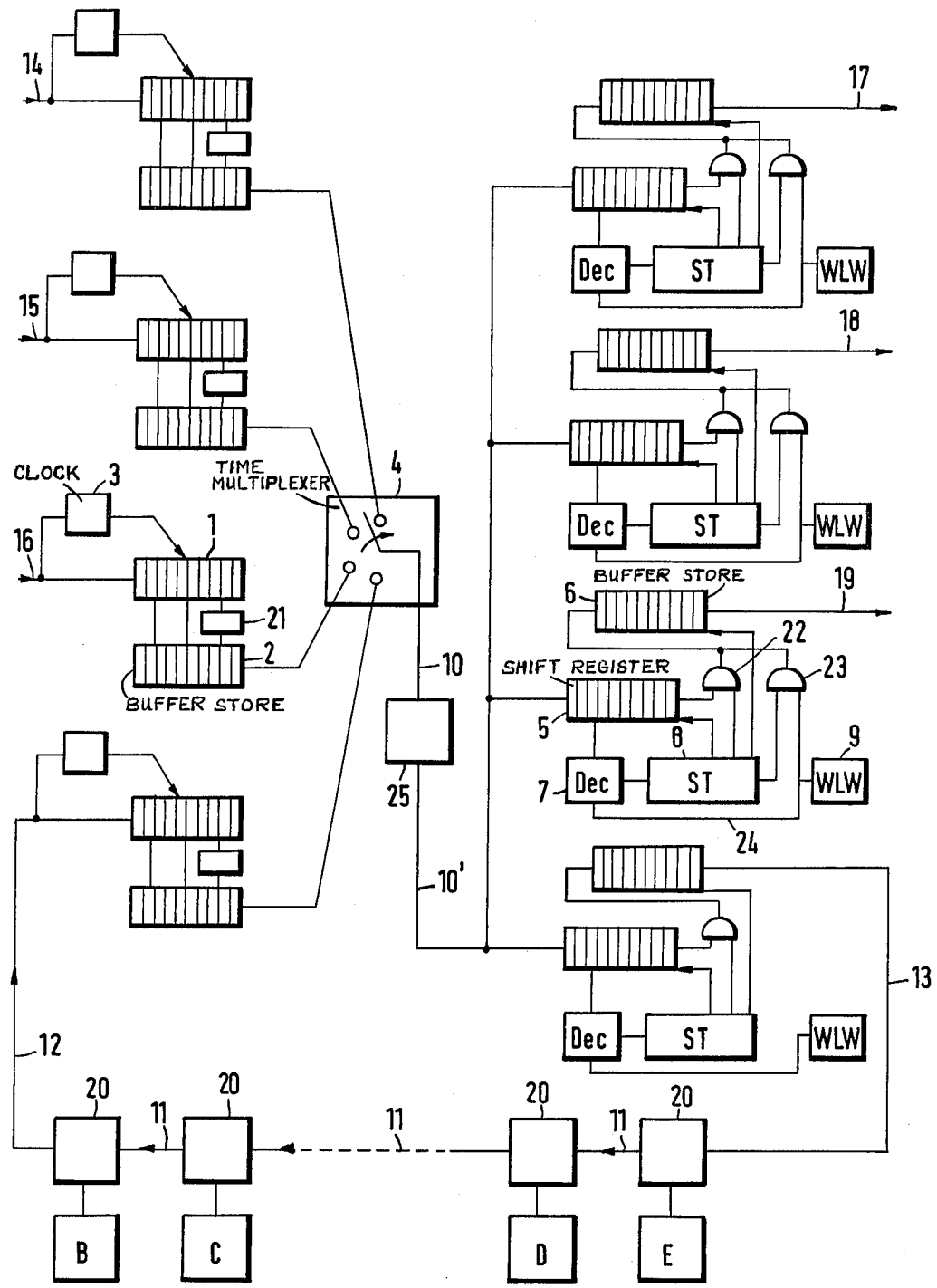
FIG. 2 shows the block diagram of one switching node of the network.

FIG. 2 shows the block diagram of a switching node, as well as the connection of the network subscribers B, C, D and E, as is known from the said U.S. Pat. Application Ser. No. 679,074.

The most important units of the switching node are the input shift register 1, the input buffer store 2, a time multiplexer device 4, the shift register 5 and the buffer store 6, 14, 15, 16 are the inputs, and 17, 18, 19 are the outputs of the node.

Independently of one another, at non-uniform intervals, packets arrive from the neighbouring nodes via the incoming bearer channels 14, 15 and 16. The packets run into the shift registers 1. The units 3 detect and regenerate the bit and frame rhythm of the packets for each input and determine when a packet stands with its beginning at the end of a shift register 1. As soon as this is the case, the entire packet is overwritten parallel into the pertinent buffer store 2, whereby the said register 1 becomes free for a new packet.

Upon overwriting a code word identifying the incoming bearer channel is added to each build-up packet by the device 21. This can, however, also take place through a device 25 which lies in the outgoing bus line 10—10' of the multiplexer 4 and adds, to the build-up packets, a routing word which corresponds to the position of the multiplexer 4.

If a shift register 2 contains a packet, then this is pushed either serially or in parallel onto the bus line 10, as soon as the interrogation arrives at this shift register 2. The interrogation of the shift registers 2 is effected so rapidly that no congestion occurs in the registers 1 and 1.

The packets arriving via the different incoming bearer channels run in time-multiplexed manner on the bus line 10 and 10'. Each packet encounters simultaneously the inputs of all of the shift registers 5 and runs into these registers. Connected to each shift register 5 is a decoder 7 which decodes the characterising fields of the packet and controls accordingly the control device 8. This device 8 in turn brings about the serial overwriting of the content from shift register 5 into the buffer store 6. In doing so individual bits can be added or suppressed by sending out shift pulses to the shift registers 5 and 6 and through opening pulses to the gates 22 and 23. The routing word WLW associated with the pertinent output 19 is stored in the store 9. The store is connected via line 24 to the decoder 7 which, in the case of information packets, compares the routing word with the respective routing word contained in the address. On the other hand the store 9 is connected via the gate 23 to the input of the buffer store 6. On this path the routing word can be introduced into the build-up packet.

The mode of operation of the decoder 7 and of the pulse generator 8 is as follows:

(a) If the decoder 7, by decoding the signalling region of the packet, ascertains a build-up packet being not too long, this packet is retransmitted with addition of a routing word. If the build-up packet is too long, it is not retransmitted. Moreover, the decoder 7 can ascertain, by means of the code word added in the input circuit or in the device 25 and characterising the incoming bearer channel, whether the packet has entered on the same bearer channel. If this is the case retransmission is blocked.

(b) If the decoder 7, by means of the signalling field of the packet assertains an information packet whose respective routing word corresponds to the routing word associated with its (the decoder's) outgoing bearer channel then the packet is overwritten into the buffer store 6 without the routing word, being removed. Information packets with respective routing words not corresponding to the outgoing bearer channel are not retransmitted.

Of course there is the possibility to combine the decoders 7, pulse generators 8, shift registers 5 and routing word stores 9 associated with the different outgoing bearer channels.

As soon as (FIG. 2) a build-up packet reaches the local subscribers line 13, it runs, via line 11, through all of the subscriber connection units 20, and is recognized, by one such unit, as being intended for it. This subscriber connection unit 20 takes over the collected-up routing address of the packet. In the case of the simplest arrangement, all possible consecutive build-up packets with the same subscriber characterization are not taken into account.

The subscriber connection units 20 contain the subscriber call number of the respectively connected subscriber, either wired or semipermanently stored through inputs via keys, switches or a plug-in card. The call number of each subscriber is location-independent; it has to be unequivocal and different from all call numbers of all the other subscribers in the telecommunication network. A comparator circuit ensures the studying of each through-running build-up packet and the discovery of those packets intended for the connected subscriber.

Packets dispatched from the subscriber stations 20 run via the lines 11 and 12 to the input shift register 1 connected to this line 12 and are further treated in the same way as the packets arriving from the bearer channels 14 through 16.

In the telecommunication network FIG. 1 exist four possibilities for building-up routing addresses from subscriber A to subscriber B with each four routing words. These four routing addresses *p/d/g/b, p/b/c/b, p/c/c/b* and *r/f/c/b* are equivalent and are built up by respectively one build-up packet. Which of these build-up packets arrives first at the subscriber B depends on the length of the bearer channels run through, and on the waiting queues in the shift registers 6 of the switching nodes run through. Upon simultaneous arrival in a node it depends on the incidental position of the multiplexer unit 4 which packet arrives first at the bus line 10 and therewith also first at the local subscribers line 13 and at the connection unit 20 of the subscriber B.

The address, built up in accordance with the described method and example and taken over by the subscriber connection unit 20 of subscriber B, indicates the path on which later information packets are supposed to run from subscriber A to subscriber B. However, the subscriber B does not need this address, but instead of that the routing address for the reversed path. Therefore in this case further procedural steps are necessary in order to acquire the routing address for the traffic between A and B and to store at the correct place. The build-up packet sent from A to B contains the call number of B as target address and the call number of A as sender address, so that B knows who has called him. B now ends a reply build-up packet which contains as target address the call number of A and, as second address, the routing address contained in the build-up packet from A to B. This reply build-up packet in turn releases a build-up procedure, at the end of which A has the needed routing address. A now sends a signalling packet to B, the routing address of which is the routing address obtained, and communicates to him the routing address built up in the reply build-up packet. Thus both partners are in possession of the necessary routing addresses and can mutually interchange packets. The paths for the two directions are generally different.

The dispatch of a reply build-up packet or of the signalling packet can be avoided if the routing words are not allocated completely free to the bearer channels of the telecommunication network, but in accordance with the rule that associated with both channels of a bearer channel pair in both adjoining nodes are in each case the same routing words. So the routing addresses for the return paths emerge from the build-up addresses for the forwards paths by simple reversal of the sequences of the collected routing words. The following example is to explain this possibility with reference to FIG. 3:

When the first build-up packet reaches the subscriber B via the switching nodes 101, 106, 105 and 104 with the newly associated routing words a, b, c, d and e, then the collected routing address reads *a/b/c/d/e*. By inverting the sequence the address *e/d/c/b/a* emerges for the return path.

B sends either a signalling packet to A which contains this inverted address both as routing address for the routing of the packet and — possibly in the original sequence — as information. Or B sends a reply packet. here the term reply packet is a packet which contains the routing address received, so that it runs back on the same path as the build-up packet received and builds up, on this path a routing address from the bearer designations of the incoming bearer channels. In these two cases the build-up packet sent from A to B does not have to contain the call number of A. A stores in both cases the routing address received from the reply packet. Thus the two subscriber terminals have the addresses necessary for an interchange. The transmission is effected for both directions on the same path.

Figure 3:
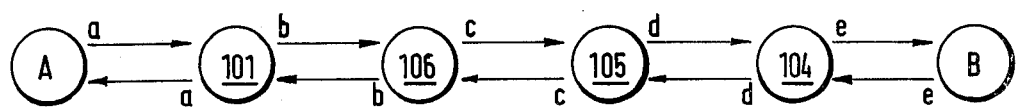
FIG. 3 shows a symbolical representation of a travel path.

In the case of FIG. 3 the routing words of the outgoing bearer channels can be collected instead of the routing words of the incoming channels, since for each intermediate connection the two are the same. Naturally in one network only the one or the other method is possible.

In FIG. 3 the designation of the bearer channel pairs in the different switching nodes is dependent on one another. Upon the insertion or removal of a node into or from the network, the designations in the nodes connected to this node have to be changed.

Figure 4:
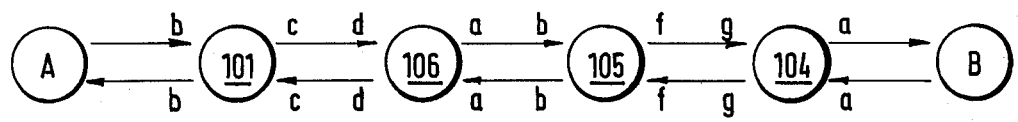
FIG. 4 shows a further representation of a travel path.

This is not necessary in the case of designations in accordance with FIG. 4. There the incoming and outgoing channels of a bearer channel pair are designated with the same routing words. However, the designation can be different at both ends of the channel pair. In the build-up packet everytime the routing word corresponding to the incoming channel is collected.

The preparation for the conversation traffic is effected in the case of the circuit designations in accordance with FIG. 4 by means of build-up packets and reply packets, as has just been described in connection with FIG. 3.

In the case of the circuit designations in accordance with FIG. 3 and FIG. 4 it is also possible that the subscriber terminal B, after receipt of a build-up packet which contains the call number of A, replies with a reply build-up packet with this call number. In this case the transmission for the two directions can be effected on different paths.

If, in a network with the bearer channel designations in accordance with FIG. 3 or FIG. 4, only a one-sided information transmission is desired, such as for example by a station A information from another station B is interrogated, then the dispatch of a correspondingly characterized build-up packet with the call number B and the build-up of a routing address in this packet with the routing words of the incoming bearer channels is sufficient. After inverting the sequence of routing words in this routing address, B can send back information packets to the interrogating station A.

The length of the routing words allocated to the different bearer channels does not need to be the same for all the channels. Since selection and eradication of a packet is dependent on the length of the routing address, bearer channels can be disadvantaged by the allocation of longer routing words relative to other channels to which shorter routing words are allocated.

The method so far described does indeed have the advantage that within the switching nodes no information regarding the addresses or the paths taken by the packets has to be stored and the expenditure for the control of the packets is minimal. However, the number of the build-up packets produced in the case of this method is large and increases exponentially with the size of the telecommunication network. In the case of extensive networks therefore a considerable proportion of the transmission capacity available on the bearer channels and within the switching nodes can be claimed by build-up packets.

A further task of the invention therefore consists in indicating a method and the pertinent devices how in the said telecommunication network during building up routing addresses the number of build-up packets can be reduced and limited. This happens in that in each build-up packet a field for the reception of a note is provided which is a quality criterion for the length and the instantaneous traffic volume of the path taken by the build-up packet, in that the note is modified in each switching node the packet reaches and in that the retransmission of a build-up packet is made dependent on the note.

The build-up packets which are described in the first portion of the description have, in addition to the signalling field, an address build-up field and a field for the subscriber call number. Supplementary to this, the build-up packets used in the case of the present method have additionally a fourth field for the reception of a note which forms a quality criterion for the length and the instantaneous traffic volume of the path which the relevant build-up packet is taking. This note is formed from the number and the traffic volume of the run-through switching nodes or bearer channels. Thus for example the note is increased in each node by one point in the case of low traffic and by $N > 1$ points in the case of heavy traffic. The number N can be ascertained uniformly for the entire telecommunication network. However, it is also possible to fix for each bearer channel or switching node an individual number $N_i$, or to make the number N variable as a function of the traffic volume.

Whereas, in the case of the method described in the first portion of the description, only the length of the routing address and therewith substantially the number of the bearer channels run through are decisive for the retransmission or non-retransmission of the build-up packets, in this case a differentiated evaluation of the transmission path is effected. The result of this is that the retransmission of the build-up packets is blocked at the latest after a specific number of run-through nodes with low traffic and earlier with more severe traffic.

Figure 5:
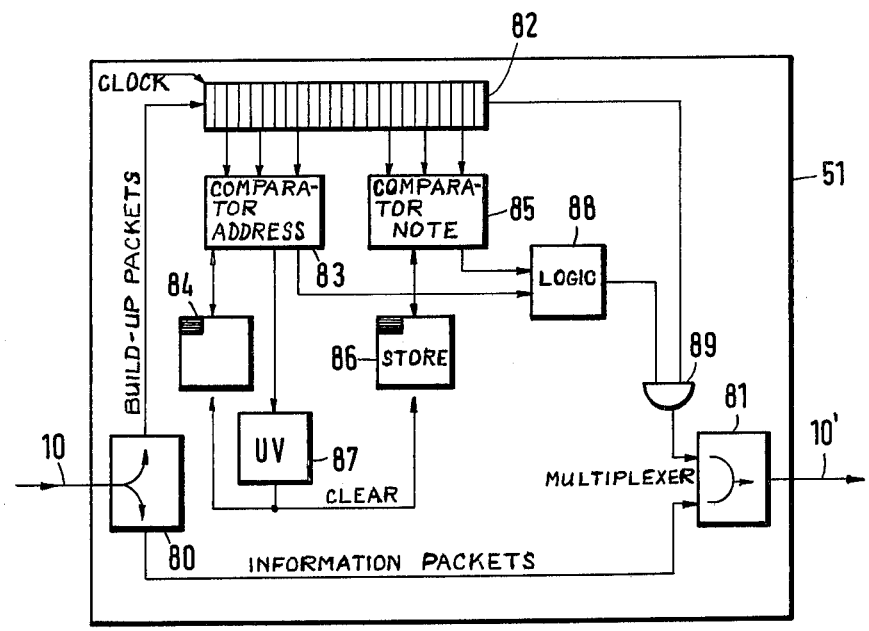
FIG. 5 shows the block diagram of a monitoring unit.

Instead of the device 25 shown in FIG. 2, now a monitoring unit 51 is inserted between the bus lines 10 and 10'. This monitoring unit 51 is shown in detail in FIG. 5 and consists of a sorting switch 80 for the separation of the information packets and the build-up packets, a multiplexer 81 for the forwarding of the information and build-up packets to the bus line 10', a shift register 82, a comparator circuit 83 for identifying the call number in the build-up packets, a store 84 for storing the call number, a comparator circuit 85 for recognizing the note, a store 86 for storing the note, a time-limitation circuit 87 for the adjustable limitation of the store time, a logic circuit 88 and a gate 89.

The functional course in the monitoring unit 51 is as follows: Via the bus line 10 all packets reach the monitoring unit 51. The sorting switch 80 separates the information packets and the build-up packets. The information packets are not further checked and pass via the multiplexer 81 to the bus line 10'. The build-up packets are shifted into the shift register 82, where the comparator circuits 83 and 85 check them to see whether their call number is already stored in the store 84 and what value the note has.

If an investigated build-up packet is the first packet of a series, then the stores 84 and 86 are empty. In this case the call number and the note are taken over and stored into the stores 84 and 85 respectively. At the same time the time-limitation circuit 87 is switched in, which after a short adjustable time cancels the content of the stores 84 and 86.

If the investigated build-up packet is a packet whose call number is already stored in the store 84, then the further treatment depends on the note. If it is worse than or equal to the note which is already stored in the store 86, then the packet is eradicated.

If the note of the considered packet is, on the other hand, better than the stored note, then this better note is taken over into the store 86 instead of the previous note.

The logic circuit 88 controls the gate 89 in such a way that only those build-up packets can pass whose note is written into the store 86. In each build-up procedure this is the case for the first incoming build-up packet and subsequently for each further build-up packet whose note is better than that of all earlier arrived packets.

The build-up packets are run forward from the shift register 82 via the gate 89 to the multiplexer 81, from where they are multiplexed into the general packet flow on the bus line 10' and leave the switching node via the outgoing bearer channels.

The number of build-up packets forwarded per build-up procedure and switching node is, through the described method, very small, since packets running via favourable paths and getting thus a favourable note, generally arrive earlier than those packets running via more unfavourable paths.

If not all switching nodes of the telecommunication network are provided with monitoring units 51 or one or the monitoring units fails, then the number of build-up packets increases only a little, since the neighbouring nodes eradicate the additionally arising build-up packets.

The procedure of the address build-up is generally shorter than one second. After that no packet any longer occurs which have anything to do with this build-up procedure. Through the time limitation circuit 87 therefore the stores 84 and 86 can be made ready to start once more for a new address build-up procedure by cancelling their content.

In a telecommunication network having numerous subscribers, it cannot be precluded that, despite the short time for an address build-up procedure, two or more build-up procedures overlap. Therefore the indicated monitoring unit 51 can be equipped by additional stores 84 and 86 and time limitation circuits 87. In this way the method for limiting the number of build-up packets becomes usable even in the case of several simultaneous address build-up procedures.

The terms and expressions which have been employed herein are used as terms of description and not of limitation, and there is no intention, in the use of such terms and expressions, of excluding any equivalents of

I claim:

1. A method of building-up a routing address for transmission of digitally addressed packets from a first to a second subscriber's station of a transmission network having a plurality of switching nodes, there being a plurality of subscriber's stations, including said first and second subscriber's stations, and a plurality of lines connecting each switching node to at least one other switching node and each subscriber's station to one switching node, routing words being individually assigned to the lines, all routing words assigned to those lines which are connected to the same switching node being distinguishable from each other;

the subscriber's stations having individual call-numbers distinguishable from each other but without an indication of the switching node to which the respective subscriber's station is connected, the method comprising the steps of:

(1) transmitting from the first subscriber's station to the switching node connected to it a build-up packet including the call-number of at least the second subscriber's station and the routing word assigned to the line which connects the first subscriber's station to the said switching node;

(2) receiving the said build-up packet incoming at the said switching node and retransmitting it to all other switching nodes and to all subscriber's station connected to said switching node, and continuing such receiving and retransmitting at each of said other switching nodes and from all further switching nodes to which retransmitted build-up packets arrive;

(3) before each of said retransmissions adding to the received build-up packet the routing word assigned to the line to which the received build-up packet is retransmitted.

thereby obtaining and retransmitting along different routes of the network an increasing number of different build-up packets each containing the call-number of the second subscriber's station and a build-up routing address consisting of the sequence of the routing words assigned to the lines successively passed along the respective route by each respective build-up packet, the lengths of the routing addresses increasing from switching node to switching node along the routes;

(4) excluding from said retransmissions build-up packets exceeding a predetermined packet length corresponding to a route length which is sufficient for transmission from any subscriber's station to any other subscriber's station of the network;

(5) comparing at each subscriber's station the second subscriber's call-number of each incoming build-up packet with the call-number of the respective subscriber's station and, when the compared call-numbers are identical, receiving the incoming build-up packet received by the second subscriber's station; and (6) storing said routing address in the first subscriber's station.

2. The method as set forth in claim 1, in which only the first of a plurality of build-up packets successively incoming at a switching node and having the same call-numbers but different routing addresses is retransmitted.

3. The method as set forth in claim 1, in which, in the second subscriber's station, a reply packet is transmitted only on the first of all subsequently received build-up packets including the call-number of the second subscriber's station.

4. The method as set forth in claim 1, in which, in the second subscriber's station the lengths of the routing addresses of subsequently received build-up packets including the second call-number is checked and a reply packet is transmitted only on that build-up packet, which has the shortest routing address.

5. The method as set forth in claim 1, in which the build-up packet transmitted from the first subscriber's station to the switching node connected to it includes the call-numbers of the first and second subscriber's stations, and said transmitting of said reply packet includes the steps of (7) transmitting from the second subscriber's station to the switching node connected to it a reply build-up packet including as information the routing address of the build-up packet received by the second subscriber's station and as build-up address the routing word assigned to the line connecting the second subscriber's station to said switching node;

(8) receiving the said reply build-up packet incoming at said switching node and retransmitting it to all other switching nodes and to all subscriber's stations connected to said switching node, and continuing such receiving and retransmitting at each of said other switching nodes and from all further switching nodes to which retransmitted reply build-up packets arrive;

(9) before each of said retransmissions adding to the received reply build-up packet the routing word assigned to the line to which the received reply-build-up packet is retransmitted,

(10) excluding from said retransmissions reply build-up packets exceeding said predetermined length;

(11) comparing at each subscriber's station the first subscriber's call-number of the incoming reply build-up packet with the call-number of the respective subscriber's station and, when the said call-numbers are identical, receiving the incoming reply build-up packet by the first subscriber's station.

6. The method as set forth in claim 1, in which said reply packet is an addressed packet, whose address is the inversed routing words sequence of the routing address of the reply packet received by the second subscriber's station.

7. The method as set forth in claim 1, in which each build-up packet is provided with a valuation index for the instantaneous length of the build-up address and the instantaneous traffic volume of the lines assigned thereto, the valuation indexes being increased in each switching node before retransmission of the build-up packet and all build-up packets whose valuation index exceeds a predetermined value being excluded from further retransmission.

8. The method as set forth in claim 7, in which the valuation index is formed by adding up units which are associated with said lines and with the switching nodes traffic volume respectively.

9. The method as set forth in claim 7, including in at least one switching node the steps of temporarily storing the second subscriber's call-number and the vuluation index of each received build-up packet;

comparing the call-number of each of succeedingly received build-up packets with the stored call-number and stored valuation index of the previously received build-up packet, retransmitting each received build-up packet and storing the valuation index thereof instead of the stored valuation index of the previously received index, if the call-number of the received build-up packet corresponds to the stored call-numbers and the valuation index thereof is lower than the stored valuation index of the previously received build-up packet; and eliminating each received build-up packet if the call-number thereof corresponds to the stored call-number and the valuation index thereof is higher than the stored valuation index of the previously received build-up packet.

10. In a switching node of a network for transmission of digitally addressed message packets, a device for retransmission of build-up packets each including the call-number of a called subscriber's station of the network and an address which is built-up by adding at each switching node a routing word assigned to that network line to which the packet is retransmitted along its path of travel from one switching node ot the next switching node, the packet further comprising a valuation index for the instantaneous length of the build-up address and the instantaneous traffic volume of the retransmitting switching node, said valuation index being stepwise increased, one step at each switching node, retransmission from the switching node provided with the said device being dependent on the instantaneous valuation index, the device comprising a register (82) for storing a received build-up packet, a first store (84) for the call-number of the previously received build-up packet, a second store (86) for the valuation index of said previously received build-up packet, two comparator circuits (83, 85) each connected to the register and to said first and second store respectively, and a logic circuit (88) controlled by the comparator circuit (83, 85) for causing retransmission only of those buildup packets which have the stored call-number and a lower than the stored valuation index.

11. The device as set forth in claim 10, including a timing circuit (87) for clearing the first and second stores a predetermined time after storing the call-number and the valuation index.

* * * * *